United States Patent [19]

Inada

[11] 4,140,275
[45] Feb. 20, 1979

[54] TEMPERATURE RESPONSIVE VALVE CONSTRUCTION

[75] Inventor: Masami Inada, Toyoake, Japan

[73] Assignee: Aisin Seiki Kabushiki Kaisha, Kariya, Japan

[21] Appl. No.: 873,846

[22] Filed: Jan. 31, 1978

Related U.S. Application Data

[63] Continuation of Ser. No. 676,408, Apr. 13, 1976, abandoned.

[30] Foreign Application Priority Data

May 16, 1975 [JP] Japan .................................. 50-66484

[51] Int. Cl.² ........................ G05D 23/00; F16K 31/06
[52] U.S. Cl. ................................... 236/87; 236/101 E; 236/101 D; 123/117 A; 251/65
[58] Field of Search ............. 236/81, 87, 48 A, 101 C, 236/101 D, 101 E; 123/117 A, DIG. 11; 251/65, 75

[56] References Cited

U.S. PATENT DOCUMENTS

| | | | |
|---|---|---|---|
| 1,288,012 | 11/1918 | Jarvis | 236/48 A |
| 2,647,017 | 7/1953 | Coulliette | 236/101 D |
| 2,906,460 | 9/1959 | Daly | 236/48 R |
| 2,949,931 | 8/1960 | Ruppright | 251/65 |
| 3,189,675 | 6/1965 | Moore et al. | 251/65 |
| 3,265,062 | 8/1966 | Hesse | 251/65 |
| 3,506,194 | 4/1970 | Resseguie | 236/101 E |
| 3,704,697 | 12/1972 | Weymann | 123/117 A |
| 3,930,613 | 1/1976 | Place | 251/75 |
| 3,961,749 | 6/1976 | Orcutt | 236/87 |

*Primary Examiner*—Henry C. Yuen
*Attorney, Agent, or Firm*—Burns, Doane, Swecker & Mathis

[57] ABSTRACT

A temperature responsive valve construction comprises a housing member having an inlet and an outlet formed therein and carrying a resilient valve seat that is adapted to interconnect the inlet with the outlet when the valve seat is open, and a one piece magnetic bimetallic snap disc closing the valve seat by snapping directly against the valve seat when sensing a certain temperature and opening the valve seat by snapping away from the valve seat when sensing another temperature. The bimetallic snap disc is held by an adjacent magnet member so that the bimetallic snap disc is held so as to be able to operate surely and completely and the valve construction can be assembled in easy manner.

5 Claims, 2 Drawing Figures

TEMPERATURE RESPONSIVE VALVE CONSTRUCTION

This is a continuation of application Ser. No. 676,408 filed Apr. 13, 1976 now abandoned.

BACKGROUND OF THE INVENTION

1. Field of the Invention

This invention relates generally to temperature responsive valves and more particularly to a temperature responsive valve for controlling fluid flow including a bimetallic snap disc which is operable in response to the temperature of a separate controlling fluid surrounding the valve.

2. Prior Art Description

Conventionally, a temperature responsive valve construction comprising a housing having open and closed ends, a valve body sealingly inserted into the housing to define a chamber between one end thereof and the closed end of the housing, inlet and outlet passages provided within the body, a valve seat member disposed about either the inlet passage or the outlet passage, a bimetal member engaging or disengaging the valve seat member by snapping over center, being held outer periphery portion thereof against the outer periphery portion of the one end of the valve body, in response to the temperature of the external fluid surrounding the housing for controlling the fluid communication between the inlet and outlet passages, and a leaf-spring disposed within the chamber for holding the outer periphery portion of the bimetal member against the outer periphery portion of the one end of the valve body by the biasing force thereof is well known.

This type of the valve construction, however, has drawbacks that the bimetal member tends to mis-snap over center due to engaging the one end of the valve body in assembly, and furthermore, the setting position of the bimetal member to the leaf-spring tends to shift from the predetermined position, whereby the fluid communication between the inlet and outlet passages is not controlled even if the temperature of the external controlling fluid is changed and the bimetal member tends to snap over center in unexpected temperature because of the change of the load characteristic on the bimetal member, because this type of the valve construction is assembled in the manner that the leaf-spring is put on the predetermined position within the housing, the bimetal member is slidingly fitted to the predetermined position on the leaf-spring, the valve body is inserted into the housing so as to engage the outer periphery portion of the one end thereof with the outer periphery portion of the bimetal member and the housing is secured to the valve body by caulking the open end thereof.

SUMMARY OF THE INVENTION

According to the present invention, therefore, there is provided a magnet member for holding the bimetal member instead of the conventional leaf-spring so that the bimetal member can normally and securely operate for controlling the fluid communication between the inlet and outlet passages and the valve construction can be assembled in easy manner.

It is, therefore, an object of the invention to provide an improved temperature responsive valve with a bimetallic snap disc.

The foregoing and other objects, features and advantages of the invention will be apparent from the following more particular description of a preferred embodiment of the invention as illustrated in the accompanying drawings.

BRIEF DESCRIPTIONS OF THE DRAWINGS

FIG. 1 is an enlarged, cross-sectional view of the temperature responsive valve of this invention and is illustrated as being utilized in the spark timing system for an internal combustion engine of a motor vehicle, and FIG. 2 is a view similar to FIG. 1 and illustrates the temperature responsive valve construction in another operating position thereof.

DETAILED DESCRIPTION OF THE PREFERRED EMBODIMENT

Figure 1:
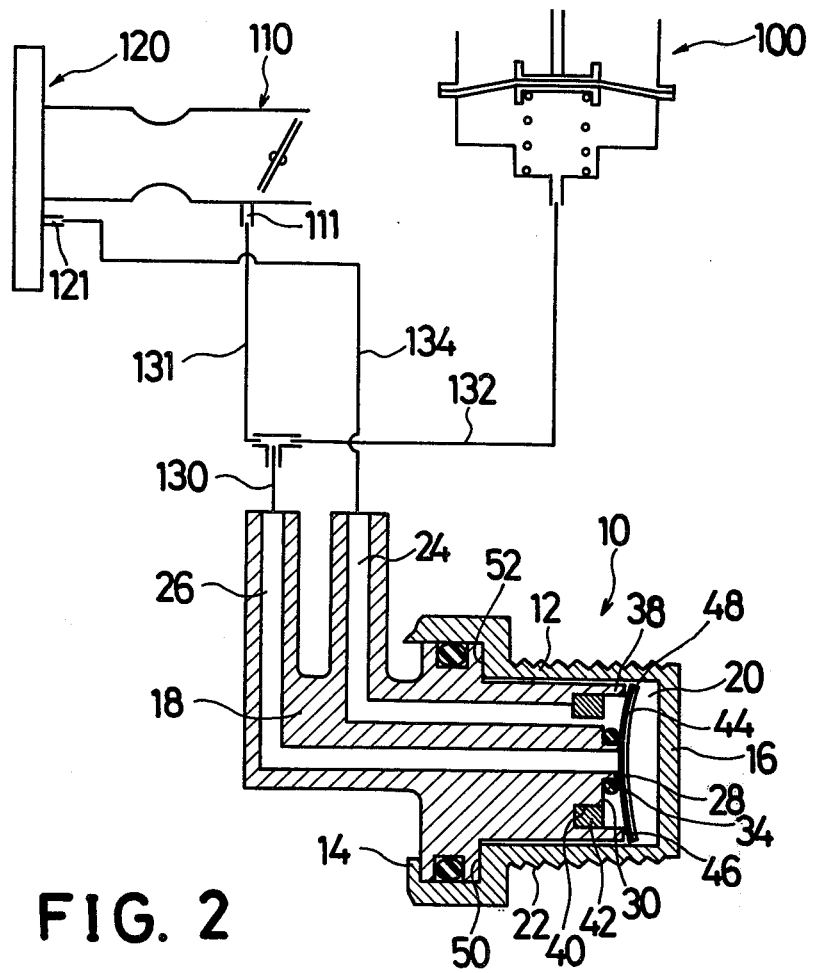

Referring now to FIG. 1, there is shown a temperature responsive valve construction generally designated by numeral 10. The temperature responsive valve constructionn 10 comprises a cup-shaped housing 12 made of a heat-conductive material, for example a brass material, having an open end 14 and a closed end 16, and a valve body 18 sealingly secured in the housing 12 to define a chamber 20 between an inner wall of the housing 12 and a right-end surface 30 of the valve body 18. The housing 12 is provided with a screw portion 22 at its outer periphery for being threaded into, for example, a water jacket (not shown) of an internal combustion engine of a motor vehicle in order to sense the change of the fluid temperature therein.

The valve body 18 includes an inlet passage 24 and an outlet passage 26 with the inlet and outlet passages 24 and 26 respectively being disposed in fluid communication with the chamber 20.

Figure 2:
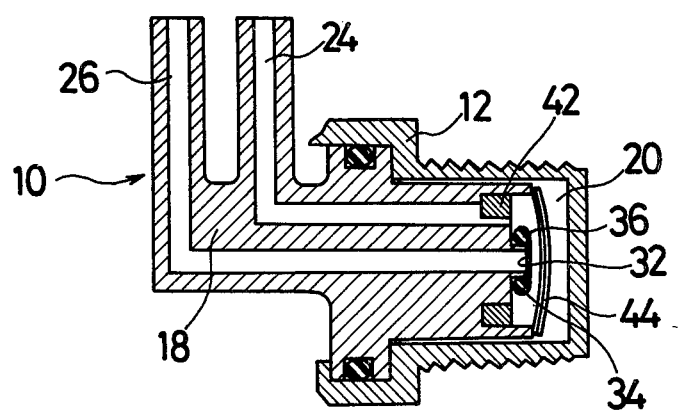

One end of the outlet passage 26 is connected to a vacuum spark advance part 111 of a conventional carburetor 110 through a conduit 130 and a conduit 131 and also connected to a spark advance vacuum unit 100 of a distributor (not shown) through the conduit 130 and a conduit 132. One end of the inlet passage 24 is connected to an air supply port 121 of an air purifier 120 through a conduit 134. The other end of the outlet passage 26 is defined by a nipple extension 28 projecting in the right direction from the right-end surface 30 of the valve body 18 at center portion of the end surface 30 and having a free end 32 (shown in FIG. 2). The other end of the inlet passage 24 communicates with the chamber 20 at the outer side portion of the end surface 30.

A resilient valve seat member 34 such as, for example, a sealing ring is disposed about the nipple extension 28 and having a free end 36 (shown in FIG. 2) beyond the free end 32 of the nipple extension 28 so that forms a valve seat for separating the outlet passage 26 from the inlet passage 24 of the valve construction 10.

The right-end surface 30 of the valve body 18 has a cylindrical projection 38 projecting in the rightward direction from the outer end portion thereof. An annular groove 40 is formed within the right-end surface 30 of the valve body 18 to retain an annular magnet 42 therein, the magnet 42 being disposed so as to continuously permit the establishment of the fluid communication between the outlet passage 26 and the chamber 20.

A bimetallic snap disc 44 made of a material having a magnetic permeability, for example an iron has its outer periphery portion 46 disposed against the end surface of the cylindrical projection 38 of the valve body 18 and is continuously held thereagainst by the action of the magnet 42.

The bimetal member 44 is so constructed and arranged that when the same senses a temperature condition surrounding the housing 12 (e.g., the fluid temperature in the water jacket) below a predetermined temperature, the bimetal member 44 is in a bowed configuration illustrated in FIG. 1 wherein the convex side thereof engages against the valve seat 36 of the valve seat member 34 to completely close the outlet passage 26 from the chamber 20, and thus the inlet passage 24. However, when the bimetallic snap disc 44 senses a temperature above the predetermined temperature, it snaps over center, being held its outer periphery portion 46 against the end surface of the cylindrical projection 38 of the valve body 18 by action of the magnet 42, in the manner illustrated in FIG. 2 so that in its snapped condition the concave side of the bimetal member 44 faces the valve seat 36 of the valve seat member 34 and is spaced therefrom so as to permit the fluid communication between the inlet passage 24 and the outlet passage 26 of the valve construction 10 for a purpose hereinafter described. Conversely, with the valve construction 10 disposed in the condition illustrated in FIG. 2, a subsequent decrease in the sensed temperature of the bimetal member 44 will cause the bimetal member 44 to snap back over center from the position illustrated in FIG. 2 back to the position illustrated in FIG. 1 to close the valve seat 36 to interrupt the fluid communication between the inlet passage 24 and the outlet passage 26.

A gap or space 48 in adequate amount is arranged between an inner periphery of the housing 12 and the outer periphery of the bimetal member 44 so that the bimetal member 44 can snap over center being held in its predetermined position.

The operation of the temperature responsive valve construction 10 of this invention utilized in the ignition timing control system for an internal combustion engine of a motor vehicle as shown in FIG. 1 is now to be described.

When the temperature of the water in the water jacket, not shown, surrounding the housing 12 is below the predetermined temperature, the bimetal member 44 is in the status in FIG. 1, wherein the convex side of the bimetal member 44 engages with the valve seat 36 of the resilient valve seat member 34 such that the fluid communication between the inlet passage 24 and the outlet passage 26 is interrupted. Accordingly, a vacuum is supplied into the spark advance vacuum unit 100 of the distributor from the vacuum spark advance part 111 of the carburetor 110 through the conduits 131 and 132, and thus the ignition timing of the engine is advanced. When the temperature of the water is above the predetermined temperature, the bimetal member 44 snaps over center to open the valve seat 36 of the resilient valve seat member 34 such that the fluid communication is established between the inlet passage 24 and the outlet passage 26 as described hereinbefore in detail. Accordingly, atmospheric air is supplied into the conduit 132 from the air purifier 120 through the conduit 134, the inlet passage 24, the chamber 20, the outlet passage 26, and the conduit 130, whereby a decreased vacuum is supplied into the spark advance vacuum unit 100 to thereby retard the ignition timing of the engine.

The temperature responsive valve construction 10 described hereinbefore in detail is assembled in the following manner.

The magnet 42 is fitted into the annular groove 40 of the valve body 18, and the resilient valve seat member 34 is disposed about the nipple extension 28. The convex side of the bimetallic snap disc 44 is put on the seat member 34, such that the bimetal member 44 is held against the resilient valve seat member 34 by action of the magnet 42. The bimetal member 44 is slidingly fitted to the predetermined position wherein the convex side surface of the bimetal member 44 is completely engaged with the valve seat 36 of the valve seat member 34 to completely close the inlet passage 24 from the chamber 20 and the outer periphery portion 46 of the bimetal member 44 is held against the end surface of the cylindrical projection 38 of the valve body 18. The housing 12 is put on the right-side portion of the valve body 18 to define the chamber 20 therebetween and a shoulder 50 of the housing 12 is engaged with a shoulder 52 of the valve body 18. The housing 12 is secured to the valve body 18 by caulking the the open end 14 of the housing 12.

From the above description of the temperature responsive valve construction 10 of this invention, it can be seen that the bimetal member 44 is surely fitted to the predetermined position without mis-snapping over center when the same is assembled. Accordingly, the temperature responsive valve construction 10 according to the present invention is assembled in simple manner and can achieve its function completely and surely.

Obviously, numerous modifications and variations of the present invention are possible in the light of the above teachings. It is to be understood therefore that within the scope of the appended claims, the present invention may be practiced otherwise than as specifically described herein.

What is claimed is:
1. A temperature responsive valve comprising:
housing means having a chamber with an end wall;
a first fluid passage in said housing means, one end of said first fluid passage communicating with said chamber, and the other end thereof communicating externally of said housing means;
a valve seat comprising a resilient ring surrounding said one end of said first fluid passage;
a second fluid passage in said housing means, one end of said second fluid passage communicating with said chamber, and the other end thereof communicating externally of said housing means;
support means on said housing and disposed within said chamber, said support means spaced from said seat in a direction laterally of said one end of said first fluid passage;
a bimetallic snap disc, formed of magnetically permeable material, disposed in said chamber between said end wall and said seat to cover said seat by assuming a convex configuration relative to said seat in response to sensing a certain temperature, and to uncover said seat by assuming a concave configuration relative to said seat in response to sensing another temperature;
said disc extending laterally to overlie said support means;
a magnetic member of annular configuration disposed on said housing means concentrically around said first fluid passage between said support means and said first fluid passage, said magnetic member including an inner circumferential surface spaced laterally outwardly of said seat and imposing magnetic attraction forces on said disc such that with said disc oriented in said concave shape a central portion of said disc uncovers said seat and a peripheral portion of said disc is magnetically urged against said support means so that upon return of said disc to said convex configuration said central portion of said disc is magnetically urged against said seat to cover the latter;

said end wall being spaced from said seat sufficiently to assure that the outer periphery of said disc is unrestrained when said disc is in said convex configuration.

2. A valve according to claim 1, wherein said inner circumferential surface of said magnetic member is disposed laterally outwardly of said seat.

3. A valve according to claim 1, wherein said inner circumferential surface is situated within said second fluid passage.

4. A valve according to claim 1, wherein said chamber includes side wall portions disposed closely adjacent outer edge portions of said disc to guide said disc as the latter snaps between said convex and concave configurations.

5. A valve according to claim 4, wherein said housing means comprises a first body member containing said end wall and said side wall portions, and a second body member containing said first and second passages and said support means, said second body member being telescopingly received within said first body member and carrying an annular resilient seal engaging an inner face of said first body member at a location spaced from said seat in a direction opposite from said end wall.

* * * * *